(12) United States Patent
Wang

(10) Patent No.: US 11,327,267 B2
(45) Date of Patent: May 10, 2022

(54) LENS MODULE

(71) Applicant: AAC Technologies Pte. Ltd., Singapore (SG)

(72) Inventor: Hailong Wang, Shenzhen (CN)

(73) Assignee: AAC Optics Solutions Pte. Ltd., Singapore (SG)

(*) Notice: Subject to any disclaimer, the term of this patent is extended or adjusted under 35 U.S.C. 154(b) by 413 days.

(21) Appl. No.: 16/526,947

(22) Filed: Jul. 30, 2019

(65) Prior Publication Data

US 2020/0057235 A1    Feb. 20, 2020

(30) Foreign Application Priority Data

Aug. 15, 2018 (CN) .......................... 201821317826.0

(51) Int. Cl.
   *G02B 7/02*     (2021.01)
   *G02B 5/00*     (2006.01)
   *G03B 11/04*    (2021.01)

(52) U.S. Cl.
   CPC ............. *G02B 7/021* (2013.01); *G02B 5/003* (2013.01); *G03B 11/045* (2013.01)

(58) Field of Classification Search
   CPC . G02B 5/00; G02B 7/02; G02B 5/003; G02B 7/021; G02B 7/022; G03B 11/04; G03B 11/045; G03B 7/00; G03B 2217/002
   See application file for complete search history.

(56) References Cited

U.S. PATENT DOCUMENTS

| 2004/0125470 A1* | 7/2004 | Chiang | G02B 7/026 359/796 |
| 2009/0015945 A1* | 1/2009 | Chen | G02B 7/021 359/819 |
| 2014/0160581 A1* | 6/2014 | Cho | G02B 13/0035 359/738 |
| 2015/0172521 A1* | 6/2015 | Yasukochi | H04N 5/2257 29/525.01 |
| 2016/0161702 A1* | 6/2016 | Yang | G02B 7/028 359/503 |
| 2016/0349504 A1* | 12/2016 | Kim | G02B 27/0018 |
| 2017/0322394 A1* | 11/2017 | Chou | G02B 1/11 |

* cited by examiner

*Primary Examiner* — Balram T Parbadia
(74) *Attorney, Agent, or Firm* — W&G Law Group

(57) ABSTRACT

Provided is a lens module, including a lens barrel, a lens group and a light-shading plate. The lens group at least comprises a first lens and a second lens. The light-shading plate is sandwiched between the first lens and the second lens. The first lens includes a first optical portion, and a first peripheral portion, which includes a first planar surface extending from an outer edge of the first peripheral portion, a recess portion connected to the first planar surface, and a second planar surface connected to the recess portion. The light-shading plate includes a third planar surface partially attached to the first planar surface, a protruding portion protruding from the third planar surface, and a fourth planar surface extending from the protruding portion towards the optical axis. The protruding portion is attached to the recess portion, and the second planar surface and the fourth planar surface are spaced apart.

8 Claims, 2 Drawing Sheets

LENS MODULE

TECHNICAL FIELD

The present disclosure relates to the field of camera lenses, and in particular, to a lens module.

BACKGROUND

With the constant development of science and technology, electronic devices have become more and more intelligent. In addition to digital cameras, portable electronic devices, such as tablet PCs and mobile phones, are also equipped with lens modules. To meet the needs of people for usage, a higher requirement is also raised on the quality of an object image captured by the lens module.

However, in the current structure of a lens, a glass lens is required to match the lens barrel or other components in view of the precision of outer diameter. At the same time, the combination of the glass lens is a difficult problem, and the overall performance of the lens may be negatively affected once the matching roundness of the glass lens is poor. The existing matching manners still can be improved to a great extent. Therefore, it is urgent to provide a novel lens module, in order to achieve higher matching stability between the glass lens and the respective components and improve the overall performance of the lens.

BRIEF DESCRIPTION OF THE DRAWINGS

Many aspects of the exemplary embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be further illustrated with reference to the accompanying drawings and the embodiments. In the embodiments described below, a direction defined by left and right sides of paper is referred to as a horizontal direction, and a direction defined by upper and lower sides of the paper and perpendicular to the horizontal direction is referred to as a vertical direction. In the present disclosure, a direction of a central axis is parallel to the vertical direction.

Figure 1:
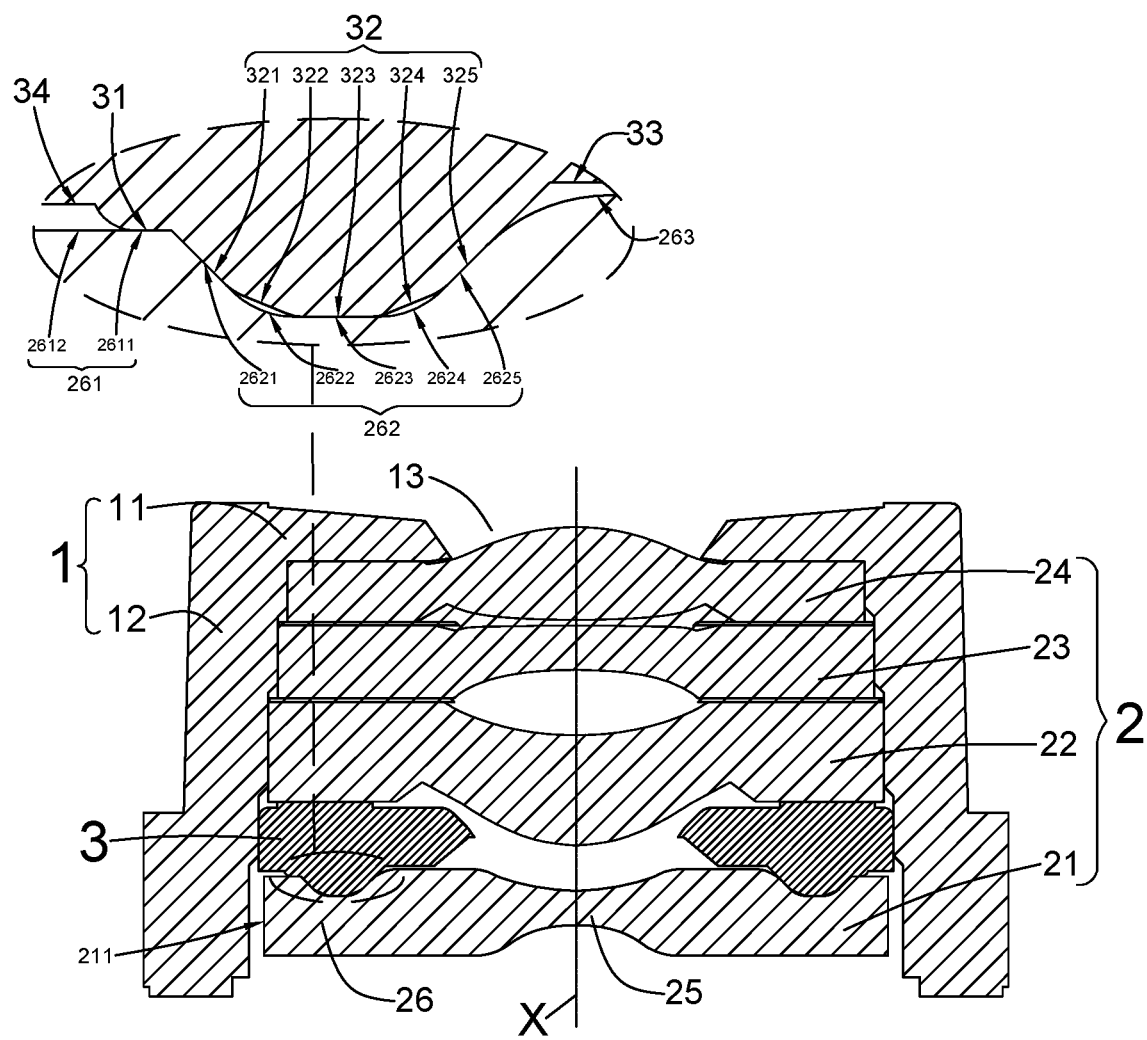
FIG. 1 is a structural schematic sectional view of a lens module according to the present disclosure.

As shown in FIG. 1, the present disclosure provides a novel lens model. The lens module includes a lens barrel 1, as well as a lens group 2 and a light-shading plate 3 that are accommodated in the lens barrel 1. The lens group 2 includes a first lens 21, a second lens 22, a third lens 23 and a fourth lens 24, which are arranged in sequence along a direction from an image side to an object side of the lens barrel 1.

In this embodiment, the lens barrel 1 includes a first barrel wall 1 forming a light-passing hole 13 and extending in a horizontal direction, a second barrel wall 22 extending from the first barrel wall 11 while being bent, and a receiving space defined by the first barrel wall 11 and the second barrel wall 12. The first barrel wall 11 includes a first surface close to the object side and a second surface close to an image side, and the lens barrel 1 may be either an integral structure or a split structure.

As shown in FIG. 1, the light-shading plate 3 is sandwiched between the first lens 21 and the second lens 22. Each lens includes an optical portion and a peripheral portion surrounding the optical portion. The first lens 21 is a glass lens. The first lens 21, the second lens 22 and the third lens 23 can be either glass lenses, or plastic lenses or lenses made of other materials; and furthermore, the number of the lenses in the lens group 2 is not limited thereto.

To further improve the matching roundness between the glass lenses and the light-shading plate and the overall assembly performance, the matching structure between the glass lenses and the light-shading plate is modified as follow.

Figure 2:
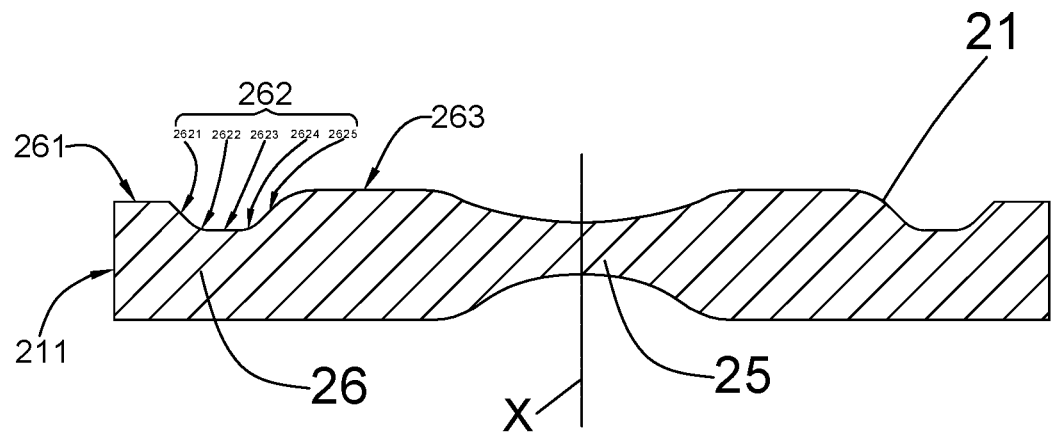
FIG. 2 is a structural schematic sectional view of a lens matching a light-shading plate in the lens module according to the present disclosure.

As shown in FIGS. 1 and 2, the first lens 21 has a symmetric structure, and a matching structure on the left part of the first lens 21 and light-shading plate 3 is illustrated as an example. The first lens 21 is a glass lens, and includes a first optical portion 25 and a first peripheral portion 26 surrounding the first optical portion 25. The first lens 21 has an upper surface as an object side surface 21A, and a lower surface as an image side surface 21B. The object side surface 21A of the first peripheral portion 26 of the first lens 21 includes a first planar surface 261 horizontally extending from an outer edge of the first peripheral portion 26 in a direction facing towards an optical axis, a recess portion 262 connected to the first planar surface 261 and formed by recessing from the object side to the image side, and a second planar surface 263 connected to the recess portion 262.

For example, the recess portion 262 includes a first oblique surface 2621 obliquely extending from the first planar surface 261 in a direction facing towards the optical axis and towards the image side, a first arcuate transitional surface 2622 connected to the first oblique surface 2621, a fifth planar surface 2623 horizontally extending from the first arcuate transitional surface 2622 towards the optical axis, a second arcuate transitional surface 2624 connected to the fifth planar surface 2623, and a second oblique surface 2625 obliquely extending from the second arcuate transitional surface 2624 in a direction facing towards the optical axis and towards the object side. The second oblique surface 2625 is connected to the second planar surface 263. The first oblique surface 2621 has a different slop from the second oblique surface 2625. A first included angle is formed between the first oblique surface 2621 and the optical axis X, and is preferably an acute angle. A second included angle is formed between the second oblique surface 2625 and the optical axis X, and is preferably an acute angle. The recess portion 262 has a length in the horizontal direction, which gradually decreases along a recess depth (i.e. along the vertical direction or the direction of the optical axis X).

Figure 3:
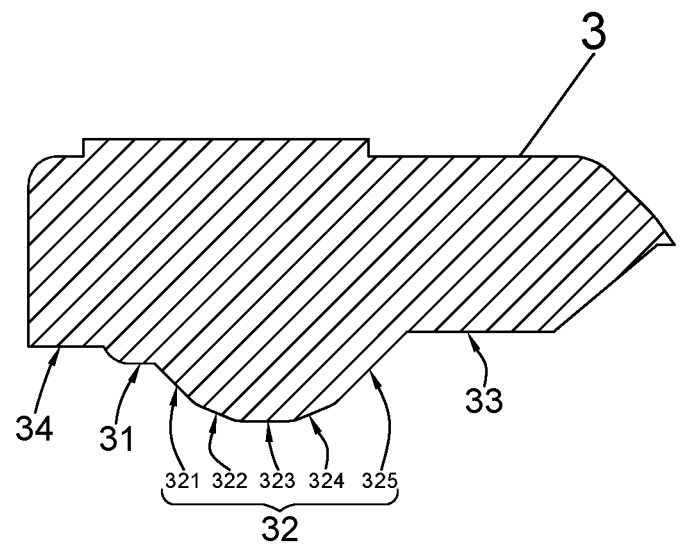
FIG. 3 is a schematic structural diagram of a light-shading plate in the lens module according to the present disclosure.

In this embodiment, as shown in FIG. 3, the light-shading plate 3 includes a third planar surface 31 partially matching the first planar surface 261, a protruding portion 32 protruding from the third planar surface 31 towards the first lens 21, and a fourth planar surface 33 horizontally extending from the protruding portion 32 towards the optical axis. The third planar surface 31 is spaced apart from an outer edge of the light-shading plate 3. The light-shading plate 3 further includes a seventh planar surface 34 connected to the third planar surface 31 and located farther away from the first lens 21 than the third planar surface 31. The seventh planar surface 34 horizontally extends form the outer edge of the light-shading plate 3 towards the optical axis. The first planar surface 261 includes a first portion 2611 attaching to the third planar surface 31 and a second portion 2612 spaced apart from the seventh planar surface 34.

For example, the protruding portion 32 includes a third oblique surface 321 obliquely extending from the third planar surface 32 in the direction facing towards the optical axis and towards the image side, a third arcuate transitional surface 322 connected to the third oblique surface 321, a sixth planar surface 323 horizontally extending from the third arcuate transitional surface 322 towards the optical axis, a fourth arcuate transitional surface 324 connected to the sixth planar surface 323, and a fourth oblique surface 325 obliquely extending from the fourth arcuate transitional surface 324 in the direction facing towards the optical axis and towards the object side.

It can be seen from FIG. 1 that the protruding portion 32 is attached to the recess portion 262. For example, the first arcuate transitional surface 2622 is spaced apart from the third arcuate transitional surface 322, and the second arcuate transitional surface 2624 is spaced apart from the fourth arcuate transitional surface 324; the sixth planar surface 323 is attached to the fifth planar surface 2623; and the third oblique surface 321 is attached to the first oblique surface 2621, and the fourth oblique surface 325 is attached to the second oblique surface 2625.

Further, the first lens 21 has an outer-edge end surface 211 spaced apart from an inner wall surface of the first barrel wall 11 by a certain distance; the second planar surface 263 is spaced apart from the fourth planar surface 33; the second planar surface 263 is located closer to the light-shading plate 3 than the first planar surface 261, i.e., the first planar surface 261 and the second planar surface 263 are not located on the same level, and accordingly, the third planar surface 31 and the fourth planar surface 33 are not located on the same level either.

In this embodiment, in order to position and assemble the first lens 21 and the lens barrel 1, a concave-convex matching structure can be formed simply by attaching the protruding portion 29 of the first matching portion 14 to the recess portion 262 of the second matching portion 27, which can lead to a better matching roundness, a higher matching stability and assembly stability. In addition, the matching structure above is more advantageous for the size adjustment of the matching portion, thereby improving the matching stable and enhancing the overall performance of the lens to a certain extent.

In addition, the light-shading sheet or plate for absorbing stray light is provided between every two adjacent lenses. The light-shading sheet and the light-shading plate can be either disposed at the same time or omitted. The second lens 22, the third lens 23 and the fourth lens 24 are fixed by pressing each other, and the outer edge of the image side surface of the first lens 21 is fixed by dispensing an adhesive or a pressing ring, thereby fixing all the lenses within the lens barrel 1.

It should be noted that other lenses in the lens group may also have the same structure as that of the first lens 21, so as to match the light-shading plate 3.

Compared with the related art, in the lens module provided by the present disclosure, the matching structure between the light-shading plate and the glass lens has better matching roundness, and the size of the matching portion can be adjust in an easier way, so that higher stability is achieved in terms of matching and assembly, thereby improving the overall performance of the lens to a certain extent.

It should be noted that, the above are merely embodiments of the present invention. Any improvement made by those skilled in the art without departing from the inventive concept of the present invention shall fall within the protection scope of the present invention.

What is claimed is:

1. A lens module, comprising:
a lens barrel;
a lens group received in the lens barrel; and
a light-shading plate received in the lens barrel,
wherein the lens group at least comprises a first lens and a second lens that are arranged from an image side to an object side, the first lens being a glass lens,
the light-shading plate is sandwiched between the first lens and the second lens,
the first lens comprises a first optical portion and a first peripheral portion surrounding the first optical portion, the first peripheral portion comprising:
a first planar surface horizontally extending from an outer edge of the first peripheral portion in a direction facing towards an optical axis;
a recess portion connected to the first planar surface and formed by recessing from the object side towards the image side; and
a second planar surface connected to the recess portion,
the light-shading plate comprises:
a third planar surface partially attached to the first planar surface;
a protruding portion connected to the third planar surface and protruding towards the first lens; and
a fourth planar surface horizontally extending from the protruding portion towards the optical axis,
wherein the protruding portion is attached to the recess portion, and the second planar surface and the fourth planar surface are spaced apart;
wherein the recess portion comprises:
a first oblique surface obliquely extending from the first planar surface in a direction facing towards the optical axis and towards the image side;
a first arcuate transitional surface connected to the first oblique surface;
a fifth planar surface horizontally extending from the first arcuate transitional surface towards the optical axis;
a second arcuate transitional surface connected to the fifth planar surface; and
a second oblique surface obliquely extending from the second arcuate transitional surface in a direction facing towards the optical axis and towards the object side,
the second oblique surface being connected to the second planar surface.

2. The lens module as described in claim 1, wherein the recess portion has a length in a horizontal direction that gradually decreases along a recess depth.

3. The lens module as described in claim 1, wherein the protruding portion comprises:
a third oblique surface obliquely extending from the third planar surface in the direction facing towards the optical axis and towards the image side;
a third arcuate transitional surface connected to the third oblique surface;

a sixth planar surface horizontally extending from the third arcuate transitional surface towards the optical axis;
   a fourth arcuate transitional surface connected to the sixth planar surface; and
   a fourth oblique surface obliquely extending from the fourth arcuate transitional surface in the direction facing towards the optical axis and towards the object side.

4. The lens module as described in claim 3, wherein the first arcuate transitional surface is spaced apart from the third arcuate transitional surface, and the sixth planar surface is attached to the fifth planar surface.

5. The lens module as described in claim 3, wherein the second arcuate transitional surface and the fourth arcuate transitional surface are spaced apart, and the sixth planar surface is attached to the fifth planar surface.

6. The lens module as described in claim 3, wherein the third oblique surface is attached to the first oblique surface, and the fourth oblique surface is attached to the second oblique surface.

7. The lens module as described in claim 1, wherein the light-shading plate further comprises a seventh planar surface connected to the third planar surface and located farther away from the first lens than the third planar surface, the seventh planar surface horizontally extending from an outer edge of the light-shading plate towards the optical axis.

8. The lens module as described in claim 7, wherein the first lens has an outer-edge end surface spaced apart from an inner wall surface of the lens barrel.

* * * * *